Dec. 23, 1941.    H. P. BENNEWITZ ET AL    2,267,296
BONDING MACHINE
Filed March 30, 1939    5 Sheets-Sheet 5
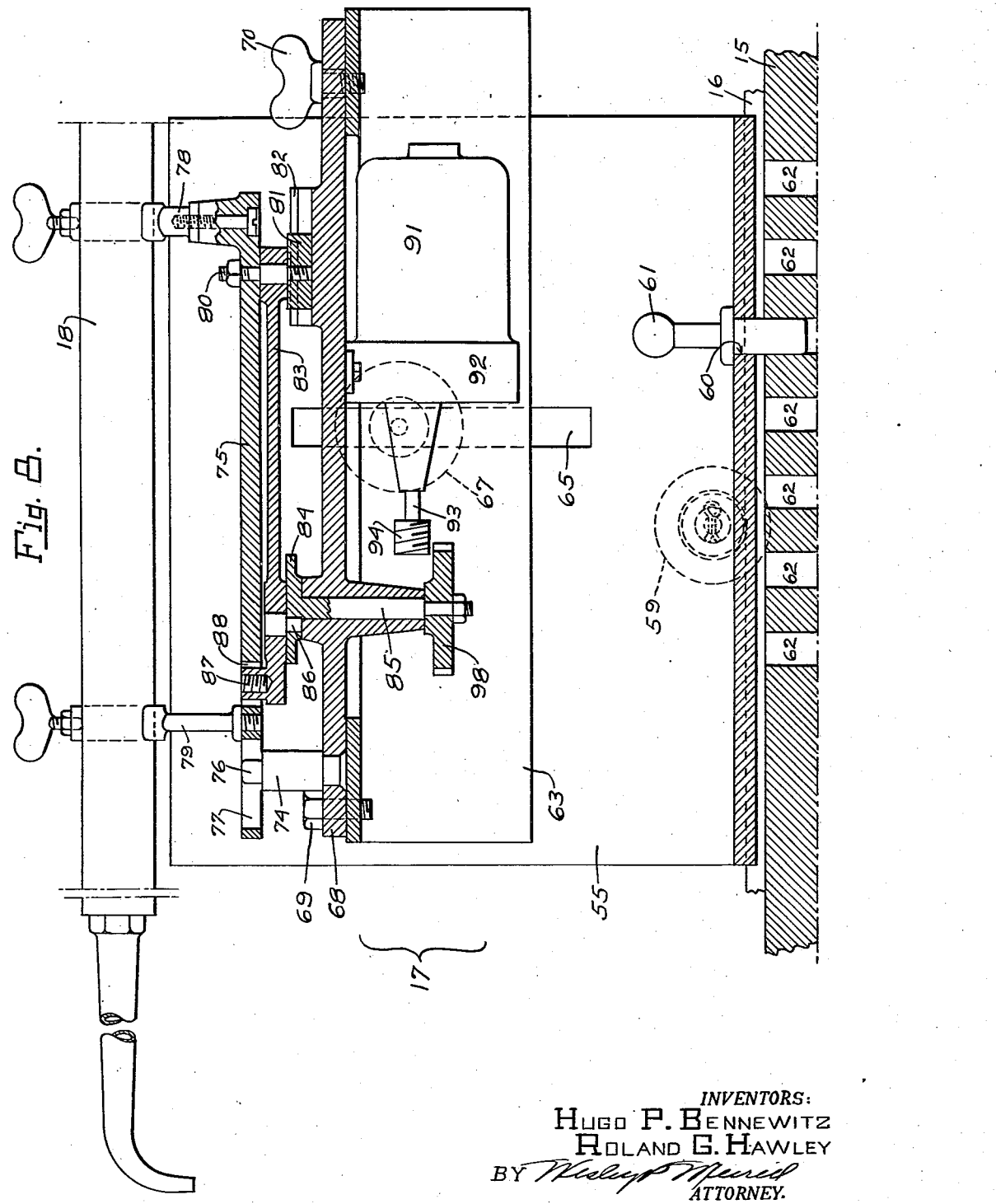
INVENTORS:
HUGO P. BENNEWITZ
ROLAND G. HAWLEY
BY
ATTORNEY.

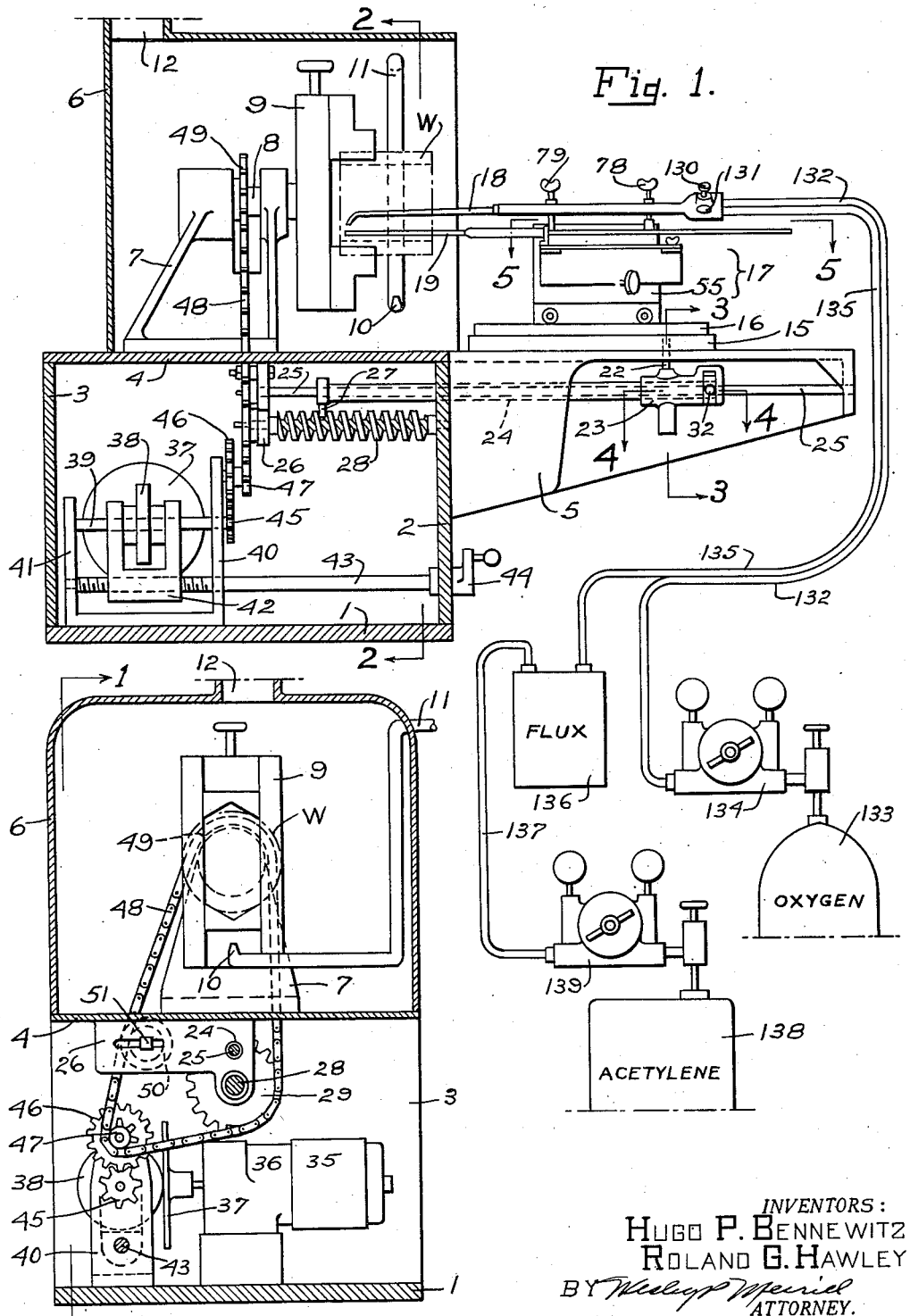

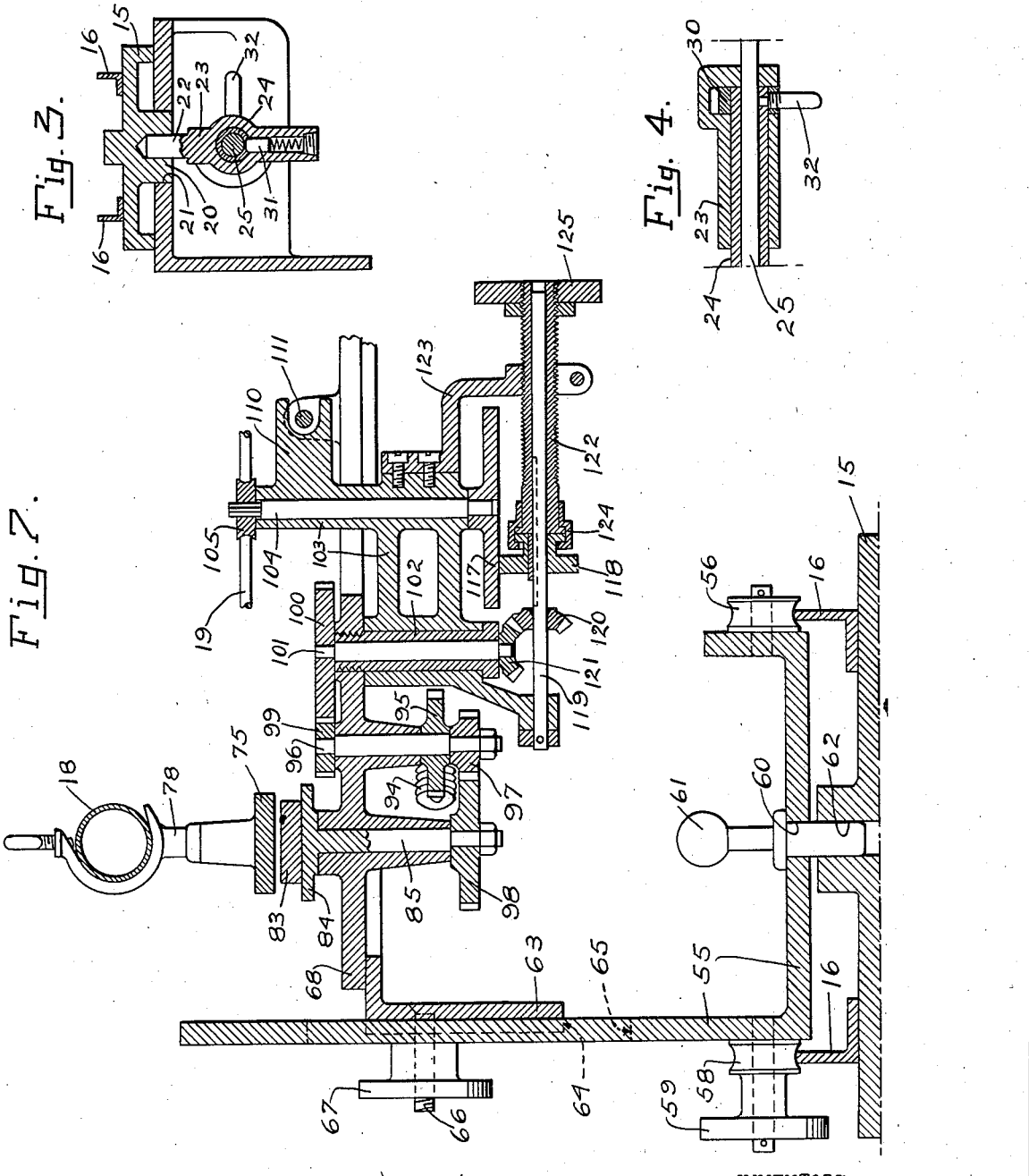

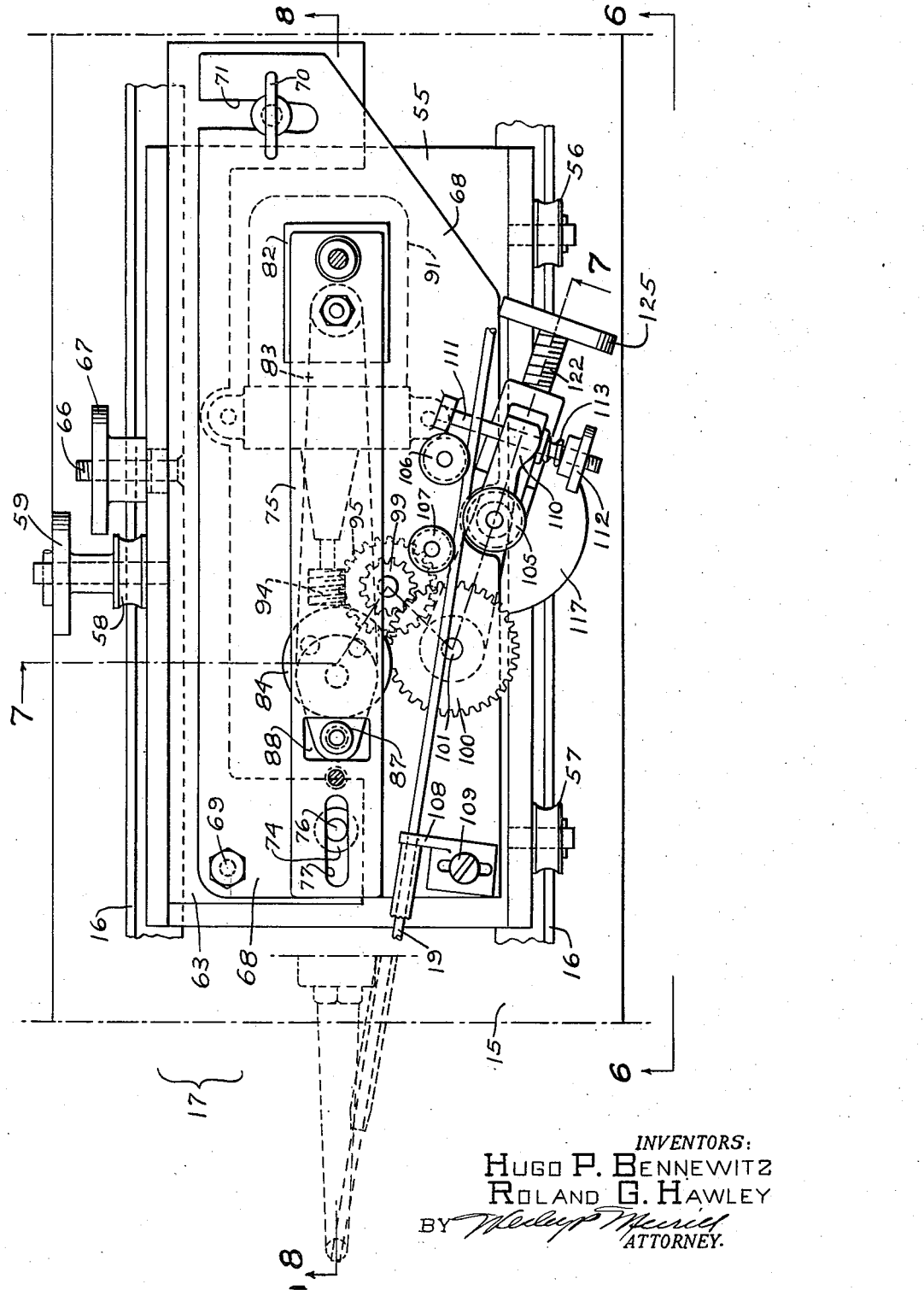

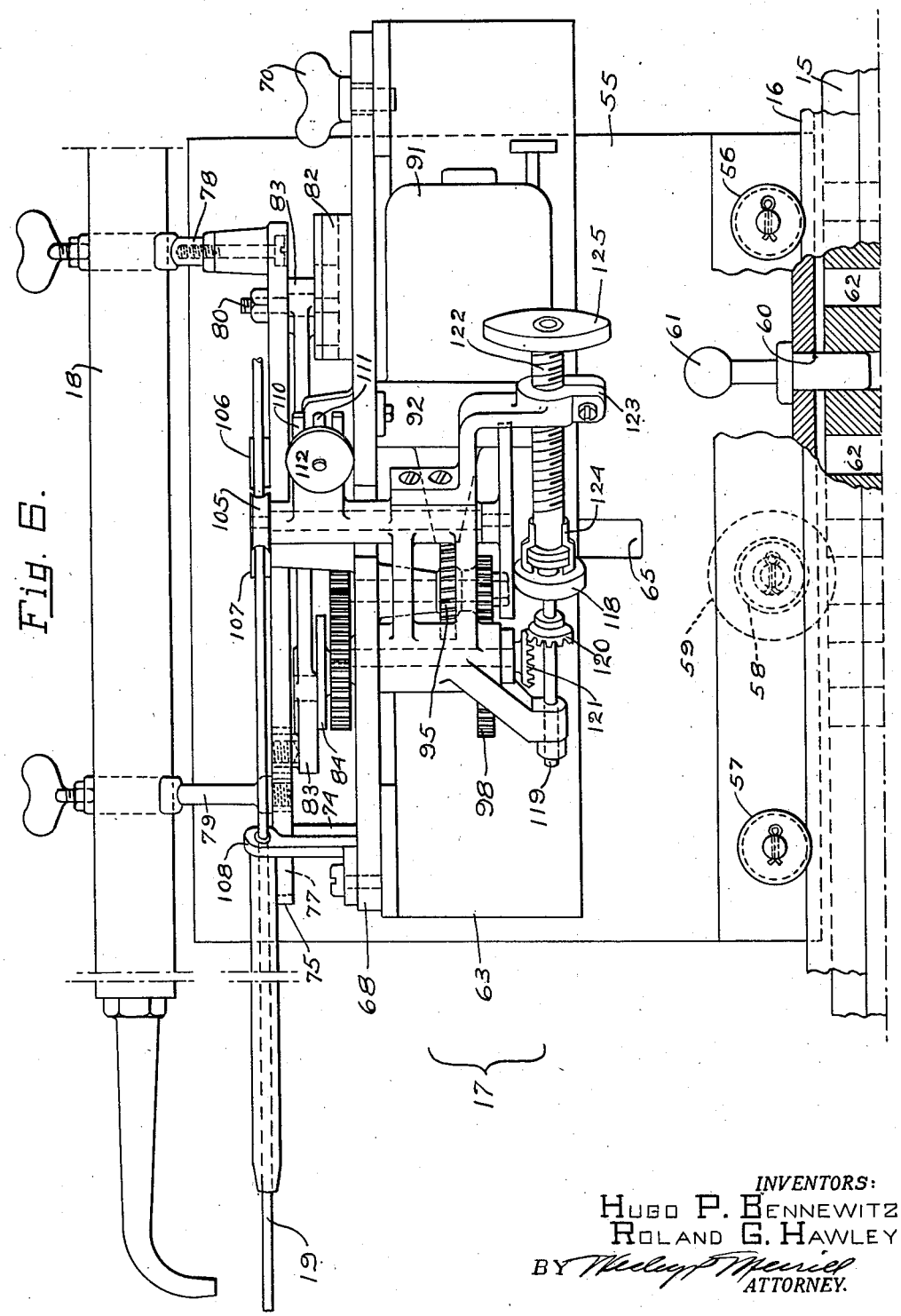

Patented Dec. 23, 1941

2,267,296

UNITED STATES PATENT OFFICE 2,267,296

BONDING MACHINE

Hugo P. Bennewitz and Roland G. Hawley, Milwaukee, Wis., assignors to The Oilgear Company, Milwaukee, Wis., a corporation of Wisconsin Application March 30, 1939, Serial No. 265,062

14 Claims. (Cl. 91—12.2)

This invention relates to the bonding or fusing of metal to a work piece and it will be explained as applied to the bonding of a bearing metal, such as bronze, to the surface of a bearing or other work piece, but it is to be understood that the invention is not limited to that particular use.

When applying a layer of bronze to the surface of a bearing, the bearing is preheated, a suitable flux is applied to the end of a bronze rod, a small quantity of bronze is melted from the end of the rod by the flame of a welding torch and allowed to drop upon the surface of the bearing, and then the flame is applied to the bearing to spread the melted bronze and cause it to adhere or bond to the surface of the bearing and to cause the surface of the bearing adjacent to bronze to be heated to the temperature necessary for the application of additional bronze which is then melted from the end of the rod by the flame of the torch, it being necessary to apply flux to the rod each time metal is melted therefrom.

This procedure requires a high degree of skill and very close attention on the part of the workman. Such close attention is required that the resultant strain on the workman necessitates that he rest after working only a few minutes. After resting, it is necessary to remelt a portion of the applied bronze and to reheat the adjacent portion of the bearing before additional bronze can be applied, thereby delaying the completion of the work.

Further, the finished bearings are often unfit for commercial use due to defects such as porosity and areas in which the bronze is not bonded to the bearing. In fact, it is found in practice that even a highly skilled workman will produce a large percentage of defective bearings.

The present invention has as an object to provide a machine which will move the torch, rod and work piece in the proper relation to each other to apply a layer of metal of uniform density to the work piece and cause it to bond therewith.

The invention is exemplified by the bonding machine shown in part in detail and in part schematically in the accompanying drawings in which the views are as follows:

Fig. 1 is a side elevation of a bonding machine in which the invention is embodied, the frame and hood being shown in section as indicated by the line 1—1 of Fig. 2.

Fig. 2 is a vertical section taken on a line 2—2 of Fig. 1.

Fig. 3 is a transverse section taken on a line 3—3 of Fig. 1.

Fig. 4 is a sectional plan view taken on a line 4—4 of Fig. 1.

Fig. 5 is a plan view taken on a line 5—5 of Fig. 1.

Fig. 6 is an elevation taken on a line 6—6 of Fig. 5.

Fig. 7 is a vertical section taken on the irregular line 7—7 of Fig. 5.

Fig. 8 is a longitudinal vertical section taken on the line 8—8 of Fig. 5.

For the purpose of illustration, the invention has been shown embodied in a machine by means of which a layer of metal may be bonded to the inner surface of a cylindrical work piece but, by modifying the machine slightly, it may be employed for bonding metal to external and flat surfaces.

The machine chosen for illustration has its mechanism carried by a frame consisting primarily of a base 1, a front wall 2, a rear wall 3, a top wall 4 and a bracket 5 which has its top arranged in alinement with top wall 4 and its rear end fixed to front wall 2 as by being welded thereto.

Top wall 4 has arranged thereon a hood 6 which is open only at its front, and a bearing 7 is arranged upon top wall 4 within hood 6 and has journaled therein a shaft 8 having a chuck 9 fixed to the front end thereof.

Chuck 9 is adapted to carry a work piece W which is ordinarily preheated before being inserted into the chuck and is kept hot by the flame from a burner 10 to which gas is supplied through a pipe 11.

In order to protect the operator of the machine from heat and fumes, hood 6 is ordinarily provided with a suitable shutter, which may be operated to partly close the front thereof, and with an exhaust opening 12 having suitable suction means therein to draw heated gases from the interior of hood 6. Since the suction means and shutter per se form no part of the present invention and are well known, they have been omitted from the drawings to avoid complicating the views.

Bracket 5 has a slide 15 arranged thereon and provided with two tracks 16 for supporting a carriage 17 which carries a welding torch 18 and a welding rod 19 and which will presently be described.

Slide 15 is adapted to be moved longitudinally of bracket 5 to thereby move torch 18 relative to work piece W, and it is restrained from lateral movement by a guide 20 fixed to the underside thereof and fitted in a slot 21 which is formed in the top wall of bracket 5 and extends longitudinally thereof.

Guide 20 is connected by means of a pin 22 to a drawhead 23 arranged upon one end of a tube 24 which extends loosely through front wall 2 and is slidable upon a rod 25 having one of its ends fixed to the front end of bracket 5 and its other end fixed to a flange 26 which depends from and is fixed to upper wall 4.

The rear end of tube 24 has fixed thereon a tooth 27 to engage the threads of a screw 28 which has its front end journaled in front wall 2 and its rear end portion journaled in flange 26 and provided with a sprocket 29. The front end of tube 24 has a collar 30 (Fig. 4) fixed thereon and arranged in a suitable recess formed in drawhead 23. The arrangement is such that, when screw 28 is rotated, tooth 27 will be moved therealong and cause tube 24, drawhead 23 and slide 15 to move longitudinally of bracket 5.

In order that slide 15 may be moved independently of screw 28, tooth 27 is retained in contact with the thread of screw 28 by a spring detent 31, which is arranged in drawhead 23 and engages a recess in tube 24, and tube 24 is provided with a lever 32 by means of which it may be rotated to swing tooth 27 out of engagement with screw 28 so that slide 15 may be moved by hand.

Power for rotating work W and for moving slide 15 is supplied by an electric motor 35 which is arranged within the frame and provided with a gear reducer 36 of well known construction.

In order that the speeds of work W and slide 15 may be varied, motor 35 may be of the variable speed type but it has been shown as being a constant speed motor and provided with a variable speed transmission such as a friction disk transmission consisting primarily of a disk 37, which is driven by motor 35 through gear reducer 36, and a disk 38 which engages disk 37 and is splined upon a shaft 39 journaled in two bearings 40 and 41 carried by base 1.

It will be obvious that, when disk 38 is in contact with the center of disk 37, it will not be rotated and, when disk 38 is shifted so that it engages disk 37 at a point offset from the center thereof, it will be rotated and will rotate shaft 39 in a direction and at a speed determined by the direction and the distance disk 38 is offset from the center of disk 37.

In order that disk 38 may be shifted, a disk shifter 42 is threaded upon an adjusting screw 43 and provided with two arms which are slidable upon shaft 39 and engage disk 38 upon opposite sides thereof. Adjusting screw 43 is suitably restrained from axial movement and journaled in bearing 41 and in front wall 2 so that, when it is rotated as by means of a crank 44 fixed to its front end, disk shifter 42 will move along screw 43 and shift disk 38 relative to disk 37.

Shaft 39 has a gear 45 fixed thereon and in mesh with a gear 46 which is rotatably supported upon bearing 40 and has a sprocket 47 fixed for rotation therewith. Sprocket 47 is connected by means of an endless chain 48 to sprocket 29 and to a sprocket 49 which is fixed on shaft 8 so that, when disk 38 rotates shaft 39, gears 45 and 46 will rotate sprocket 47 which will drive chain 48 and thereby cause shaft 8 and screw 28 to be rotated.

The speeds of shaft 8 and screw 28 may be varied relatively to each other by replacing either or each of sprockets 29 and 47 with a sprocket having a different pitch diameter. In order to take up any slack in chain 48 caused by changing sprockets, an idler sprocket 50 engages chain 48 and is journaled upon a shaft 51 which is mounted in flange 26 and adapted to be moved therealong to compensate for variations in sprocket diameters.

Referring now more particularly to Figs. 5 to 8, carriage 17 has a frame 55 which is approximately L shaped in cross section as shown in Fig. 7. Frame 55 is provided on its near side with two rollers 56 and 57 and on its far side with a roller 58 which engage tracks 16 and support carriage 17 thereon, roller 58 being provided with a knob 59 which may be turned to cause the rollers to roll upon the tracks and thereby move carriage 17 toward or from work W.

In order that carriage 17 may be fixed to slide 15, frame 55 has a hole 60 formed in the bottom thereof and a pin 61 is adapted to be inserted through hole 60 and into any one of a plurality of holes 62 which are formed in slide 15 and arranged in a row extending longitudinally thereof.

Carriage 17 has its mechanism carried by a support 63 which is angular in cross section as shown in Fig. 7 and has a gib 64 fixed to its vertical leg and fitted in a vertical slot 65 which is formed in the vertical wall of frame 55 as shown in Figs. 7 and 8.

A screw 66 is fixed to the vertical leg of support 63, extends through slot 65 and has a hand nut 67 threaded upon its outer end. By loosening nut 67, support 63 may be moved vertically to adjust the height of torch 18 and then nut 67 may be tightened to clamp the vertical wall of frame 55 between support 63 and the rear face of nut 67 to thereby fasten support 63 in adjusted position.

The horizontal leg of support 63 has a large portion thereof cut away, as indicated by dotted line in Fig. 5, in order to clear certain mechanism carried by a plate 68 which rests upon support 63.

Plate 68 is fastened to support 63 by means of a bolt 69, which extends through one corner of plate 68 and is threaded into the left end portion of support 63, and by a thumb screw 70 which is threaded into the right end portion of support 63 and extends through a slot 71 formed in plate 68 near the right end thereof as shown in Fig. 5.

Plate 68 has a post 74 (Fig. 8) fixed thereto to support the left end of a bar 75 which carries torch 18. Post 74 has a guide 76 fixed to its upper end and fitted in a slot 77 which is formed in bar 75 and extends longitudinally thereof so that bar 75 may move longitudinally but is restrained from lateral movement.

Torch 18 is fastened to bar 75 by a clamp 78, which is pivotally connected to bar 75 at the right end thereof, and by a clamp 79 which has its stem threaded into bar 75 adjacent slot 77 as best shown in Fig. 8.

The right end of bar 75 is supported by a shouldered bolt 80 from a slide 81 fitted in a guide 82 which is fixed to plate 68 and permits slide 81 and bar 75 to reciprocate longitudinally but prevents them from moving laterally.

Bar 75 is adapted to be reciprocated by a connecting rod 83 having one end journaled upon the enlarged part of bolt 80 and its other end arranged upon a horizontal disk 84 fixed to the upper end of a vertical shaft 85 which is journaled in an elongated bearing carried by plate 68. Connecting rod 83 is connected by a crank pin 86 to disk 84 at a point offset from the center thereof as shown in Fig. 8 so that, when disk 84 is rotated, connecting rod 83 will reciprocate bar 75 and, since torch 18 is fixed to bar 75, it will be reciprocated in a straight line which has been found to be the most desirable motion when the machine is employed to bond a metal lining to the inner surface of a cylinder.

In order that the tip of torch 18 may be caused to travel in an approximately elliptical path, which has been found to be the most desirable motion when the machine is employed for bonding metal to a flat surface, clamp 79 may be disengaged from bar 75 and then screwed into a projection 87 which is formed upon the left end of connecting rod 83 and extends upward through an opening 88 formed in bar 75, opening 88 being large enough to permit projection 87 to oscillate as disk 84 rotates.

Since slide 81 can travel only in a straight path, rotation of disk 84 will cause projection 87 to travel in an elliptical path. Consequently, since clamp 78 can travel only in a straight path, the tip of torch 18 will be moved in an elliptical path when clamp 79 is fastened to projection 87 and disk 84 is rotated.

Power for rotating disk 84 is supplied by an electric motor 91 which is fastened to the under side of plate 68 and provided with a gear reducer 92 the output shaft 93 of which has a worm 94 fixed thereto as shown in Fig. 8.

Worm 94 meshes with a worm wheel 95 (Figs. 5 and 7) fixed upon a vertical shaft 96 which is journaled in an elongated bearing carried by plate 68. Shaft 96 has a gear 97 fixed upon the lower end thereof and meshing with a gear 98 which is fixed upon the lower end of shaft 85 so that, when motor 91 is energized, it will rotate disk 84 through gear reducer 92, shaft 93, worm 94, gear 95, shaft 96, gear 97, gear 98 and shaft 85, thereby causing bar 75 and torch 18 to be reciprocated.

Shaft 96 (Fig. 7) has a gear 99 fixed upon the upper end thereof and in mesh with a gear 100 fixed upon the upper end of a vertical shaft 101 journaled in a sleeve bearing 102 which is fixed to plate 68 and depends therefrom. Sleeve bearing 102 rotatably supports a bearing bracket 103 which carries mechanism for feeding rod 19 toward the tip of torch 18.

Bracket 103 extends outward beyond the edge of plate 68 and has a vertical shaft 104 journaled in a part thereof which extends upward beyond the top of plate 68. Rod 19 extends between a roller 105, which is fixed to the upper end of shaft 104, and two rollers 106 and 107 which are rotatably supported by plate 68. Rod 19 also passes through a guide 108 which is adjustably secured to plate 68 as by means of a bolt 109.

In order to cause roller 105 to press rod 19 against rollers 106 and 107, bearing bracket 103 is provided with a bifurcated arm 110 which extends laterally therefrom, an adjusting screw 111 extends through arm 110 and has nut 112 threaded upon its outer end and its inner end fastened to a suitable lug carried by plate 68, and a spring 113 encircles screw 111 between arm 110 and nut 112 and urges roller 105 against rod 19 so that, when roller 105 is rotated, it will feed bar 19 toward the tip of torch 18, the force exerted by roller 105 upon bar 19 being regulated by turning nut 112 to adjust the tension of spring 113.

Power for rotating roller 105 is derived from motor 91 and, in order that the feed rate of bar 19 may be varied, roller 105 is driven through a variable speed transmission which has been shown as a friction disk transmission.

As shown in Fig. 7, shaft 104 has a friction disk 117 fastened upon its lower end and engaged by a disk 118 splined upon a horizontal shaft 119 which has a bevel gear 120 fixed thereon and in mesh with a bevel gear 121 fixed upon the lower end of shaft 101 so that, when shaft 101 is rotated by motor 91 to cause reciprocation of torch 18 as previously explained, roller 105 will be rotated and feed rod 19 toward the tip of torch 18 at a speed determined by the distance disk 118 is offset from the center of disk 117.

Shaft 119 is rotatably supported in part by bearing bracket 103 and in part by a tube 122 which is threaded through a split bearing 123 carried by bracket 103. Tube 122 has its inner end rotatably connected to disk 118, as by means of a suitable coupling 124, and its outer end provided with a knob 125 which may be rotated to cause tube 122 to move through bearing 123 and thereby move disk 118 toward or from the center of disk 117.

In preparing the machine for operation, torch 18 is supplied from suitable sources with oxygen and acetylene the flow of which is controlled by two valves 130 and 131 which are standard parts of a welding torch. As shown, valve 130 is connected by a flexible tube 132 to an oxygen tank 133 through a reducing valve 134 which regulates the pressure of the gas delivered to the torch when the tank valve is open, and valve 131 is connected by a flexible tube 135 to the outlet of a fluxer 136 which contains a quantity of flux and has its inlet connected by a flexible tube 137 to an acetylene tank 138 through a reducing valve 139 which regulates the pressure of the gas delivered to the torch when the tank valve is open.

When the several valves are opened, torch 18 will be supplied with a mixture of oxygen and acetylene, the acetylene in passing through fluxer 136 will pick up particles of flux and deposit them upon the surface of the work piece, and the gas mixture when ignited will produce a flame of sufficient intensity to melt metal from rod 19 and cause it to be bonded to the surface of the work piece. The bonding metal, flux and bonding flame are thus applied to the work piece simultaneously and continuously.

If the machine is to be employed to bond a layer of metal to the interior of a cylindrical work piece, tooth 27 (Fig. 1) is disengaged from screw 28, and slide 15, and torch 18 are so positioned that the tip of torch 18 will be spaced the proper distance directly above the rear end of the work piece when it is fastened in chuck 9. Thumb screw 70 (Fig. 5) is loosened and plate 68 is swung on bolt 69 until the tip of welding torch 18 is slightly offset in the direction of rotation from the lowest point on the work piece. Crank 44 (Fig. 1) and knob 125 (Fig. 7) are so adjusted that slide 15 and rod 19 will be moved at the proper speeds when the motors are started, it being understood that suitable dials or other indicia may be provided to facilitate adjusting crank 44 and knob 125. Pin 61 (Fig. 8) is removed and carriage 17 is moved away from hood 6. Burner 10 (Fig. 1) and torch 18 are lighted, a preheated work piece is clamped in chuck 9, carriage 17 is adjusted until the tip of torch 18 is above the rear end of the work piece, and pin 61 is reinserted into the hole 62 from which it was removed to thereby fasten carriage 17 to slide 15. Motor 35 (Fig. 1) and motor 91 (Fig. 8) are started and rod 19 is pushed ahead until its end is beneath the tip of torch 18.

Motor 35 will rotate the work at a slow speed and motor 91 will oscillate torch 18 and cause rod 19 to be fed toward the tip of torch 18. Torch 18 will melt metal from rod 19 and cause it to bond to the work piece, thereby causing a narrow strip of metal to be applied to the work piece as it rotates. This strip will at first be concentric due to the carriage feed being ineffective.

When the work piece has nearly completed a revolution, lever 32 (Fig. 3) is operated to cause tooth 27 (Fig. 1) to engage the threads of screw 28. Then screw 28 will cause slide 15 to move slowly toward the front of bracket 5, thereby causing the metal to be applied to the work piece in a spiral strip which is bonded to the work piece and fused with the previously applied metal. Metal is continuously applied in this manner until the entire inner surface of the work piece or so much thereof as may be desired has a solid layer of metal bonded thereto.

After a layer of metal has been properly bonded to a work piece, a record of the several adjustments of the machine may be made so that the machine may be adjusted according to that record whenever a layer of similar metal is to be bonded to a similar work piece, thereby avoiding the danger that the metal might be improperly bonded or be of non-uniform density due to errors of judgment on the part of the workman.

The invention herein set forth is susceptible of various modifications and adaptations without departing from the scope thereof as hereafter claimed.

The invention is hereby claimed as follows:

1. In a machine having a welding torch for supplying heat to a welding rod and to a work piece to cause metal to be melted from said rod and bonded or fused to said work piece, the combination of a cover driven feed mechanism for moving said torch relative to said work piece at a regulated rate, means for feeding said rod toward the tip of said torch at a regulated rate, and an oscillating mechanism driven with said rod feeding means for causing the tip of said torch to oscillate.

2. In a machine having a welding torch for supplying heat to a welding rod and to a work piece to cause metal to be melted from said rod and bonded or fused to said work piece, the combination of means for moving said work piece at a regulated rate, means for feeding said rod toward the tip of said torch at a regulated rate, means for causing the tip of said torch to oscillate, and means for adjusting said oscillating means to cause the tip of said torch to oscillate either in a straight path or in an arcuate path.

3. In a machine having a welding torch for supplying heat to a welding rod and to a work piece to cause metal to be melted from said rod and bonded or fused to work piece, the combination of means for moving said work piece at a regulated rate, means for feeding said rod toward the tip of said torch at a regulated rate, means advancing said torch relative to said work piece at a regulated rate, and means for changing the angle between the axis of said torch and the path followed by said torch during its advanced movement.

4. In a machine having a welding torch for supplying heat to a welding rod and to a work piece to cause metal to be melted from said rod and bonded or fused to said work piece, the combination of means for moving said work piece at a regulated rate, means for feeding said rod toward the tip of said torch at a regulated rate, means for advancing said torch relative to said work piece at a regulated rate, means for changing the angle between the axis of said torch and the path followed by said torch during its advance movement, means for causing the tip of said torch to oscillate, and means for adjusting said oscillating means to cause the tip of said torch to oscillate either in a straight path or in an arcuate path.

5. In a machine having a welding torch for supplying heat to a welding rod and to a work piece to cause metal to be melted from said rod and bonded or fused to said work piece, the combination of means for rotating said work piece at a regulated rate, means for feeding said rod toward the tip of said torch at a regulated rate, a power driven feed feed mechanism for advancing said torch along a path substantially parallel to the axis of said work piece, and an oscillating mechanism driven with said rod feeding means for causing the tip of said torch to oscillate.

6. In a machine having a welding torch for supplying heat to a welding rod and to a work piece to cause metal to be melted from said rod and bonded or fused to said work piece, the combination of means for rotating said work piece at a regulated rate, means for feeding said rod toward the tip of said torch at a regulated rate, means for moving said torch substantially parallel to the axis of said work piece, means for causing the tip of said torch to oscillate, and means for adjusting said oscillating means to cause the tip of said torch to oscillate either in a straight path or in an arcuate path.

7. In a machine having a welding torch for supplying heat to a welding rod and to a work piece to cause metal to be melted from said rod and bonded or fused to said work piece, the combination of means for rotating said work piece at a regulated rate, means for feeding said rod toward the tip of said torch at a regulated rate, means for advancing said torch along a path substantially parallel to the axis of said work piece, and means for changing the angle between the axis of said torch and the path followed by said torch during its advance movement.

8. In a machine having a welding torch for supplying heat to a welding rod and to a work piece to cause metal to be melted from said rod and bonded or fused to said work piece, the combination of means for feeding said torch across said work piece at a regulated rate, means for feeding said rod toward the tip of said torch at a regulated rate, means for changing the angle between the axis of said torch and the path followed by said torch during its feed movement, means for supplying to said torch a fuel which when ignited will produce a bonding flame, and means for applying a flux to said work piece throughout and simultaneously with the application of said flame to said work piece.

9. In a machine having a welding torch for supplying heat to a welding rod and to a work piece to cause metal to be melted from said rod and bonded or fused to said work piece, the combination of means for feeding said torch across said work piece at a regulated rate, means for feeding said rod toward the tip of said torch at a regulated rate, means for changing the angle between the axis of said torch and the path followed by said torch during its feed movement, means for supplying to said torch a fuel which when ignited will produce a bonding flame, means for applying a flux to said work piece throughout and simultaneously with the application of said flame to said work piece, and means for causing the tip of said torch to oscillate.

10. In a machine having a welding torch for supplying heat to a welding rod and to a work piece to cause metal to be melted from said rod and bonded or fused to said work piece, the combination of means for feeding said torch across said work piece at a regulated rate, means for feeding said rod toward the tip of said torch at a regulated rate, means for changing the angle between the axis of said torch and the path followed by said torch during its feed movement, means for supplying to said torch a fuel which when ignited will produce a bonding flame, means for applying a flux to said work piece throughout and simultaneously with the application of said flame to said work piece, means for causing the tip of said torch to oscillate, and means for adjusting said oscillating means to cause the tip of said torch to oscillate either in a straight path or in an arcuate path.

11. A bonding or fusing machine, comprising a frame, a support carried by said frame for supporting a piece of work to which a layer of metal is to be bonded or fused, a second support carried by said frame for supporting a welding torch and a rod of said metal, means for supplying fuel and a flux to said torch simultaneously, means arranged upon said second support for feeding said rod toward the tip of said torch, power driven means for moving each of said supports relative to the other support at a regulated rate, and means arranged upon said second support for oscillating said torch.

12. A bonding or fusing machine, comprising a frame, a support carried by said frame for supporting a piece of work to which a layer of metal is to be bonded or fused, a second support carried by said frame for supporting a welding torch and a rod of said metal, means for supplying fuel and a flux to said torch simultaneously, means arranged upon said second support for feeding said rod toward the tip of said torch, means for moving each of said supports relative to the other support at a regulated rate, means arranged upon said second support for oscillating said torch, and means for adjusting said oscillating means to cause the tip of said torch to oscillate either in a straight path or in an arcuate path.

13. A bonding or fusing machine, comprising a frame, a support carried by said frame for supporting a piece of work to which a layer of metal is to be bonded or fused, a second support carried by said frame for supporting a welding torch and a rod of said metal, means for supplying fuel and a flux to said torch simultaneously, means arranged upon said second support for feeding said rod toward the tip of said torch, means for moving each of said supports relative to the other support at a regulated rate, means arranged upon said second support for oscillating said torch, and means for changing the angle between the axis of said torch and the axis of said second support.

14. A bonding or fusing machine, comprising a frame, a support carried by said frame for supporting a piece of work to which a layer of metal is to be bonded or fused, a slide carried by said frame, a carriage arranged upon said slide for carrying a welding torch and a rod of said metal, means for supplying fuel and a flux to said torch simultaneously, means for fastening said carriage to said slide in adjusted position, means arranged upon said carriage for feeding said rod toward the tip of said torch, means for operating said work support to move said work relative to said torch, power driven means for feeding said slide at a regulated rate in a direction different from the direction of movement of said work, and means arranged upon said carriage for oscillating said torch.

HUGO P. BENNEWITZ.
ROLAND G. HAWLEY.